Figure 1:
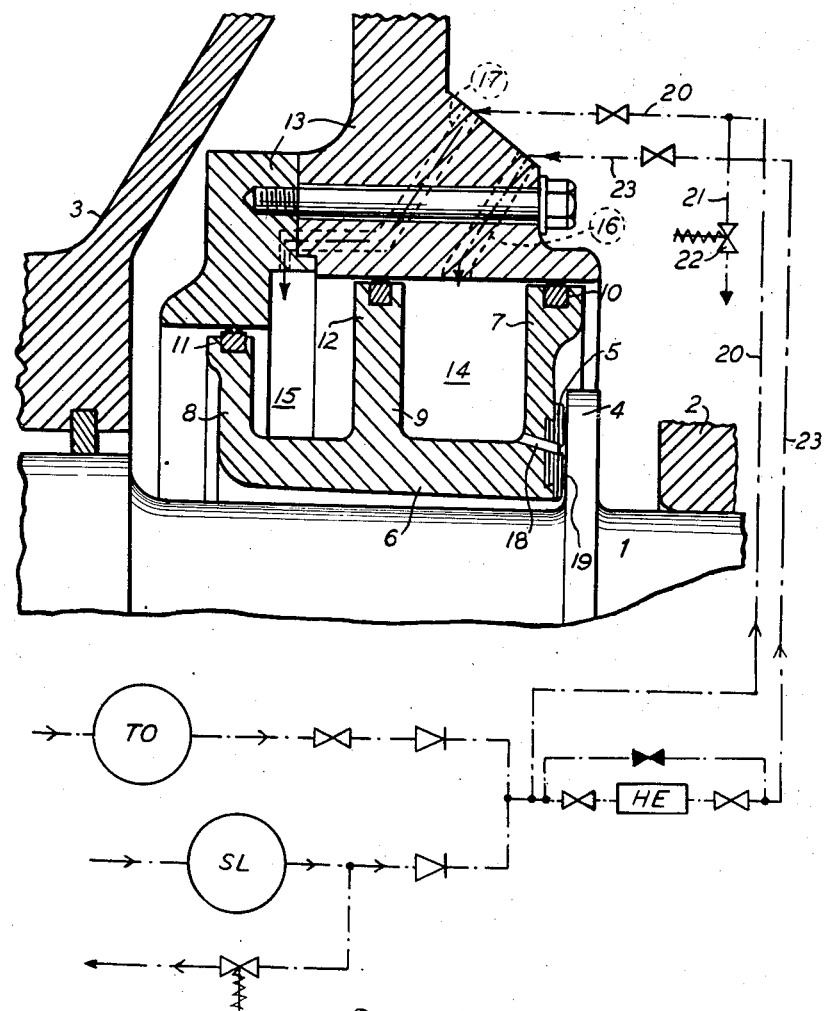

Sept. 3, 1957 F. R. L. CREEK 2,805,090
LIQUID SEALS FOR GAS-COOLED DYNAMO ELECTRIC MACHINES
Filed July 1, 1954 3 Sheets-Sheet 3

INVENTOR
Frederick R.L. Creek
By Morris & Bateman
ATTORNEYS

United States Patent Office 2,805,090
Patented Sept. 3, 1957

2,805,090

LIQUID SEALS FOR GAS-COOLED DYNAMO ELECTRIC MACHINES

Frederick Ronald Leverett Creek, Chorlton-Cum-Hardy, England, assignor to Metropolitan-Vickers Electrical Company Limited, London, England, a British company Application July 1, 1954, Serial No. 440,786

Claims priority, application Great Britain July 9, 1953

4 Claims. (Cl. 286—10)

This invention relates to liquid-sealed glands for the rotatable shafts of hydrogen- or other gas-cooled dynamo electric machines and particularly to such gland arrangements, of the kind exemplified in our British Patent No. 660,051, namely in which a sealing member of generally cylindrical form freely surrounding the machine shaft and having at one end a bearing surface abutting against a collar fast with the shaft is provided adjacent said end with a radial flange of greater diameter than a second radial flange adjacent the other end which radial flanges are integral or fast with said cylindrical member and at their outer peripheries are axially slidable in substantially liquid-tight manner in respective cylindrical bores in a fixed housing member, the annular space defined by the cylindrical member, its flanges and the housing member being in communication through ducting in the cylindrical member with said abutting surface thereof, whereby when sealing liquid is supplied under appropriate pressure to said annular space, a liquid seal is formed between the abutting surfaces of the cylindrical member and the shaft collar and these surfaces are urged into engagement by differential thrust due to the action of the liquid pressure in the annular space on the flanges of greater and lesser diameter.

According to the present invention, in an arrangement of the kind above set forth the cylindrical member is provided intermediately of the end flanges of greater and less diameter with a further flange having a diameter which as compared with the difference between the diameters of the end flanges corresponds relatively closely to the diameter of one or the other of the end flanges, the intermediate flange being, like the end flanges, axially slidable in liquid-tight manner at its outer periphery in a cylindrical bore in the fixed housing member so that the annular space between the cylindrical member and the housing member is subdivided into two chambers, namely a reservoir chamber defined between the intermediate flange and the end flange of corresponding diameter and a pressure chamber defined between the intermediate flange and the other end flange, the reservoir chamber being arranged to communicate through ducting or the like with the abutting surfaces of the cylindrical member and shaft collar.

In use, oil or other suitable liquid is supplied at appropriate pressure to the annular pressure chamber so that the differential action of the liquid on its defining flanges, due to their substantially different diameters, will tend to urge the abutting surfaces of the cylindrical member and shaft collar into engagement, whereas the other annular chamber is utilised as a reservoir for oil or other suitable liquid to provide the liquid seal at said abutting surfaces.

With the double chamber arrangement of liquid seal of this invention the liquid pressure tending to retain the abutting surfaces of the cylindrical member and shaft collar respectively in contact will be constant for all axial positions of the cylindrical member. By contrast, for a single chamber liquid seal the liquid pressure in the annular space between the cylindrical member and the housing member is dependent upon the ease with which the liquid can escape to the abutting surfaces of the cylindrical member and the shaft collar so that when the cylindrical member is axially displaced from the shaft collar the sealing liquid flows more freely and the pressure tending to urge the cylindrical member back into contact with the shaft collar is reduced; accordingly, in order to ensure that the cylindrical member will return to the position of abutment wtih the shaft collar it is necessary to supply the sealing liquid at a higher pressure than when the abutting surfaces are in engagement. Moreover, with the double-chamber liquid seal according to the invention, since the liquid pressures in the two annular chambers are independent, the pressure in each chamber can be adjusted to the most satisfactory value in relation to the operating pressure of the hydrogen or other cooling gas for the machine with which the liquid seal is used. For instance, the chamber for feeding the sealing liquid can be maintained at the minimum differential pressure (above the hydrogen- or other gas-pressure) necessary to ensure sealing irrespective of the pressure necessary to maintain the cylindrical sealing member in abutting relation with the shaft collar; accordingly, the liquid flow to the hydrogen or gas side of the liquid seal can be kept to the minimum value, thus to result in lower hydrogen leakage. Conversely, for high gas pressures, namely when high sealing liquid pressures are in use, the pressure in the pressure chamber is not increased and there is no increase in the thrust on the abutting surfaces between the cylindrical member and the shaft collar due to the sealing liquid pressure.

Figure 2:
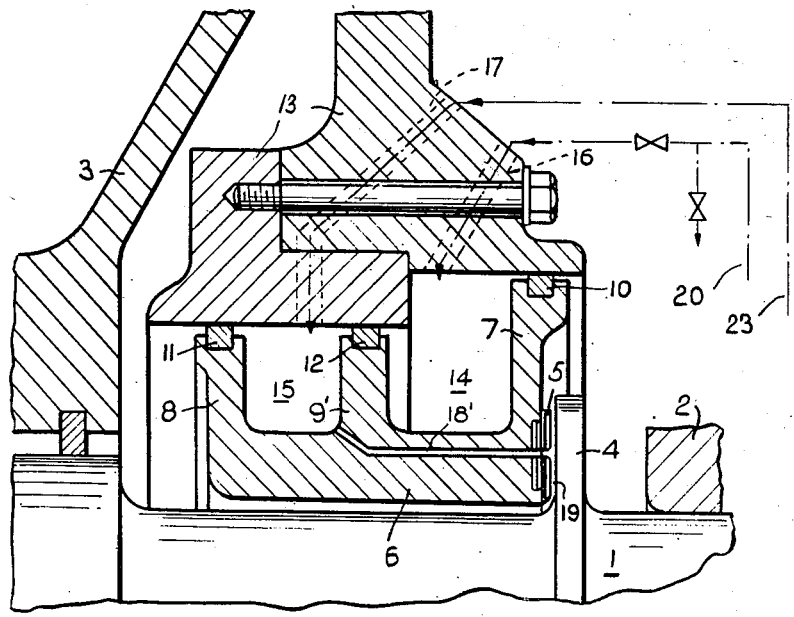
Figure 1A:
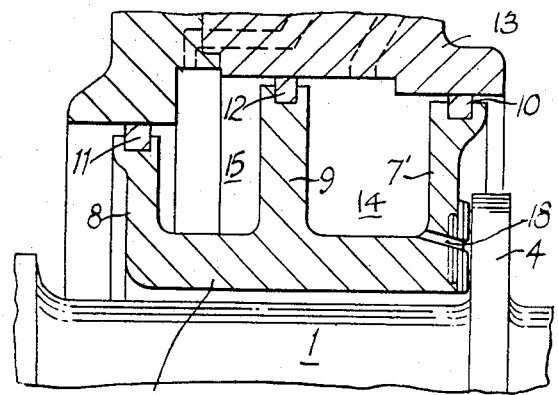
Figure 2A:
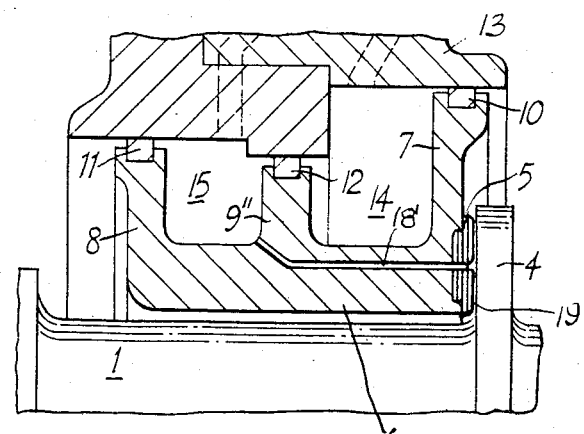

In order that the invention may be more fully understood reference will now be made to the accompanying drawings in which Fig. 1 schematically illustrates a gland seal arrangement in accordance with the invention, together with a suitable oil supply system therefor indicated in chain dotted lines, Fig. 2 schematically illustrates an alternative gland arrangement in accordance with the invention, corresponding parts in these figures having been given the same reference numerals, and Figs. 1a and 2a illustrate modifications of Figs. 1 and 2 respectively, corresponding parts having again been given the same reference numerals.

Referring first to Fig. 1 of the drawing, the numeral 1 indicates part of the shaft of, say, a hydrogen cooled alternator, 2 indicates part of the shaft bearing and 3 indicates part of the end closure member of the alternator casing. The shaft 1 is provided with an annular collar 4 which on its side towards the interior of the alternator casing is engaged by an annular thrust bearing element 5, of white metal or other anti-friction material, carried at one end of a cylindrical sealing member 6.

The member 6 is provided with outwardly extending annular flanges 7 and 8 adjacent its opposite ends—of which flanges the flange 7 nearer the bearing element 5 has an appreciably greater diameter than the flange 8— and with an intermediate flange 9 having substantially the same diameter as the flange 7. The outer peripheries of these flanges 7, 8 and 9 bear through sealing rings 10, 11 and 12 of rubber or other suitable material on the inner surfaces of appropriate cylindrical bores provided in a composite annular member 13 forming part of or secured in gas tight manner to the outside of the alternator casing end cap; the flanges are axially slidable in their respective bores. There is thus formed between the sealing member 6, its flanges 7, 8 and 9 and the annular member 13 two chambers 14 and 15 which are arranged in operation to be supplied with pressure oil through respective feed ducts 16 and 17 in the member 13. The differential pressure effects of the oil in the chamber 15 (the pressure chamber) on the flanges 8 and 9 due to their different diameters urges the member 6 in the direction towards the collar 4 on the shaft 1, thereby maintaining the bearing element 5 in abutting relationship with the collar 4, while oil from the chamber 14 (the reservoir chamber) flows through ducting 18 in the member 6 to the thrust face 19 between the bearing element 5 and the collar 4 whereby by virtue of its excess pressure over that of the cooling hydrogen for the alternator to form a liquid seal substantially preventing escape of hydrogen from the alternator casing. The oil from the chamber 14 also lubricates the thrust face 19 and is preferably arranged to have a cooling action thereon as well.

As an alternative to the arrangement of Fig. 1, the arrangement of Fig. 2 could be used which is generally similar thereto with the exception that the intermediate flange 9' is in this case substantially equal in diameter to the flange 8 instead of to the flange 7 as in Fig. 1, so that the chamber 15 between the flanges 8 and 9, now becomes the reservoir chamber communicating through suitable ducting 18' with the thrust face 19 while the chamber 14 constitutes the pressure chamber the differential pressure effects in which due to the difference in diameter of the flanges 7 and 9' maintain the bearing element 5 and the collar 4 in abutting relationship.

Where the gland arrangement is intended for use with very high gas pressures such as might tend to cause excessive pressure on the thrust face 19—it being appreciated that the gas pressure in the alternator will act on the rear flange (8) of the member 6 and thereby tend to urge the bearing element 5 against the collar 4—such excess pressure may be relieved, in accordance with a modification of the invention, by making the flange of the reservoir chamber which is nearer the bearing surface end of the sealing member somewhat smaller in diameter than the alternate flange of that chamber while maintaining between the intermediate flange and the alternate flange of the pressure chamber a substantial difference in diameter such as to produce in the pressure chamber the required differential pressure effects for urging the abutting surfaces of the sealing member and shaft collar together. In this way there will be set up in the reservoir chamber a relatively small differential pressure effect tending to oppose and thus relieving the loading effect of the gas pressure on the thrust face. Thus in modifying the arrangement of Fig. 1 to this end the diameter of the flange 7 would be reduced to a value somewhat smaller than that of the flange 9 but still substantially greater than that of the flange 8. This is illustrated in Fig. 1a in which it will be seen that the flange 7', which corresponds to the flange 7 in Fig. 1, is now somewhat smaller in diameter than the flange 9, the diameter of the bore in member 13 being correspondingly reduced for the flange 7' as indicated. Likewise in modifying Fig. 2 for the same purpose the diameter of the flange 9' would be reduced to a value somewhat smaller than that of the flange 8, this modification being illustrated in Fig. 2a in which the flange 9", corresponding to flange 9' in Fig. 2, is of reduced diameter from that of the flange 8 and the cooperating portion of the bore in the member 13 is correspondingly reduced in diameter as shown.

In all of the arrangements described the oil pressure in the reservoir chamber would be chosen so as normally to exceed the gas pressure by a suitable amount necessary to maintain an adequate seal, and by correctly proportioning the diameters of the various flanges on the sealing member and the oil pressures within the chambers a substantially gas tight seal may be obtained with the bearing pressure on the thrust face kept within reasonable limits.

Referring again to Fig. 1 of the drawing and dealing now with the supply system for the sealing oil (or other liquid) as indicated in chain dotted lines in that figure, it is envisaged to supply sealing oil or other liquid through the duct 17 to the pressure chamber 15 from a small bore pipe or ducting 20 connected directly to the outlet of a sealing liquid pump SL or, in the case of a turbo-alternator, a turbine oil supply pump TO; since there is effectively no outlet from this chamber 15, the pressure within the chamber may be regulated by allowing liquid to escape from the small bore pipe 21 at a location adjacent the gland arrangement through an adjustable spring-loaded relief valve 22. The sealing liquid reservoir chamber 14 may be supplied through the duct 16 from a small bore pipe or ducting 23 connected to the outlet of the sealing liquid pump SL or turbine oil supply pump TO, this supply being by way of a heat exchange device HE where it is intended that the liquid circulated through the chamber 14 will be utilised, in addition to providing the liquid seal and lubrication at the abutting surfaces of the cylindrical member 6 and shaft collar 4, also to provide cooling at these surfaces.

For the arrangement of Fig. 2 the pipe 20 would be arranged to feed the sealing liquid through the duct 16 to the chamber 14, which in this arrangement constitutes the pressure chamber, the pipe 23 being arranged to feed the chamber 15, constituting the reservoir chamber through the duct 17.

What I claim is:

1. A sealing gland arrangement for effecting a seal between the casing and rotating shaft of a hydrogen or other gas-cooled dynamo electric machine, comprising in operative association a collar fast with the shaft, a generally cylindrical sealing member freely surrounding the shaft and having at one end a transverse bearing surface abutting said collar, which sealing member has fast therewith three axially-spaced radial flanges of which the flange nearest the bearing surface has a substantially greater diameter than the flange farthest from said surface while the intermediate flange has a diameter corresponding relatively closely to that of one of the other flanges, and a fixed gland housing member having cylindical bores within which the outer peripheries of said flanges are axially slidable in substantially liquid-tight manner thereby to define a reservoir chamber between the intermediate flange and the flange of corresponding diameter and a pressure chamber between the intermediate flange and the remaining flange, said chambers having ducting communicating therewith for conveying sealing liquid thereto and the reservoir chamber having ducting leading therefrom to said bearing surface.

2. A sealing gland arrangement for effecting a seal between the casing and rotating shaft of a hydrogen or other gas-cooled dynamo electric machine, comprising in operative association a collar fast with the shaft, a generally cylindrical sealing member freely surrounding the shaft and having at one end a transverse bearing surface abutting said collar, which sealing member has fast therewith three axially-spaced radial flanges of which the flange nearest the bearing surface has a substantially greater diameter than the flange farthest from said surface while the intermediate flange has a diameter corresponding relatively closely to that of said flange nearest the bearing surface, and a fixed gland housing member having cylindrical bores within which the outer peripheries of said flanges are axially slidable in substantially liquid-tight manner thereby to define a reservoir chamber between the intermediate flange and said flange nearest the bearing surface and a pressure chamber between the intermediate flange and the remaining flange, said chambers having ducting communicating therewith for conveying sealing liquid thereto and the reservoir chamber having ducting leading therefrom to said bearing surface.

3. A sealing gland arrangement for effecting a seal between the casing and rotating shaft of a hydrogen or other gas-cooled dynamo electric machine, comprising in operative association a collar fast with the shaft, a generally cylindrical sealing member freely surrounding the shaft and having at one end a transverse bearing surface abutting said collar, which sealing member has fast therewith three axially-spaced radial flanges of which the flange nearest the bearing surface has a substantially greater diameter than the flange farthest from said surface while the intermediate flange has a diameter corresponding relatively closely to but being somewhat greater than that of said flange nearest the bearing surface, and a fixed gland housing member having cylindrical bores within which the outer peripheries of said flanges are axially slidable in substantially liquid-tight manner thereby to define a reservoir pressure chamber between the intermediate flange and the flange nearest the bearing surface, the relatively small difference in diameter of these flanges being effective to reduce excessive bearing pressures resulting from high cooling gas pressures, and a pressure chamber between the intermediate flange and the remaining flange, said chambers having ducting communicating therewith for conveying sealing liquid thereto and the reservoir chamber having ducting leading therefrom to said bearing surface of the sealing member.

4. A sealing gland arrangement for effecting a seal between the casing and rotating shaft of a hydrogen or other gas-cooled dynamo electric machine, comprising in operative association a collar fast with the shaft, a generally cylindrical sealing member freely surrounding the shaft and having at one end a transverse bearing surface abutting said collar, which sealing member has fast therewith three axially-spaced radial flanges of which the flange nearest the bearing surface has a substantially greater diameter than the flange farthest from said surface while the intermediate flange has a diameter corresponding relatively closely to but being somewhat less than that of said flange farthest from the bearing surface, and a fixed gland housing member having cylindrical bores within which the outer peripheries of said flanges are axially slidable in substantially liquid-tight manner thereby to define a reservoir pressure chamber between the intermediate flange and the flange farthest from the bearing surface, the relatively small difference in diameter of these flanges being effective to reduce excessive bearing pressure resulting from high cooling gas pressures, and a pressure chamber between the intermediate flange and the remaining flange, said chambers having ducting communicating therewith for conveying sealing liquid thereto and the reservoir chamber having ducting leading therefrom to said bearing surface of the sealing member.

References Cited in the file of this patent

UNITED STATES PATENTS

| | | |
|---|---|---|
| 1,122,051 | Wohlenberg | Dec. 22, 1914 |
| 2,246,912 | Baudry | June 24, 1941 |

FOREIGN PATENTS

| | | |
|---|---|---|
| 660,051 | Great Britain | Jan. 23, 1950 |